FIG 1a

March 2, 1965   S. NATELSON   3,171,722
GAS EXTRACTOR AND EJECTOR FOR GAS CHROMATOGRAPHY
Filed Sept. 4, 1962   6 Sheets-Sheet 3

SAMUEL NATELSON
*INVENTOR.*

BY George B. Oujevolk attorney

March 2, 1965 S. NATELSON 3,171,722
GAS EXTRACTOR AND EJECTOR FOR GAS CHROMATOGRAPHY
Filed Sept. 4, 1962 6 Sheets-Sheet 4

SAMUEL NATELSON
*INVENTOR.*

BY George B. Oujevolk attorney

United States Patent Office

3,171,722
Patented Mar. 2, 1965

3,171,722
GAS EXTRACTOR AND EJECTOR FOR GAS CHROMATOGRAPHY
Samuel Natelson, Valley Stream, N.Y., assignor to Scientific Industries, Inc., Springfield, Mass., a corporation of Delaware
Filed Sept. 4, 1962, Ser. No. 221,172
9 Claims. (Cl. 23—253)

The present invention relates to an instrument for the accurate sampling of gases or liquids for the purpose of injecting them into a flowing gas stream of an inert gas such as argon or helium which will carry the sample to a gas chromatography instrument usually having a column designed for the separation of the sample into its component parts and a detector for detecting and assaying the components as they leave the column.

Gas chromatography is a widely used technique for determining the components of a mixture. Present practice consists of sampling a small volume of material (e.g. 1 to 100 microliters) into a syringe. The needle of the syringe is sharp and narrow so that the sample can be injected through a rubber dam into the stream of a flowing inert gas. The gas carries the sample to a column for separation. This column can be a narrow capillary or an inert supporting medium which is coated with a film of non-volatile oil. The components of the sample now are progressively dissolved and eluted from the non-volatile oil. Since gases, such as propane and butane, would have different solubility and elution rates from the oil, they gradually separate. As they leave the column, the different fractions are detected by a variety of procedures such as differences in thermal conductivity from the inert carrying gas, effect on the conductivity of a flame when burned, conductivity of ions formed when activated by a radioactive substance such as tritium or strontium-90 and a variety of other procedures.

In the case of gases like oxygen, nitrogen and carbon dioxide, the columns may contain no oil but contain a granular material such as natural or synthetic aluminum silicates or silica gel. In this case, the gases diffuse into the pores of the material and diffuse out sequentially. Thus, in effect the porous material serves to separate the gases such as oxygen and nitrogen by their different rate of diffusion into and out of the porous substances. Eventually, the gases separate and can be detected by various techniques, usually thermal conductivity. It is apparent that in this technique of gas chromatography, the column needs to be tailored to fit the needs of the substances to be separated. A column which is satisfactory for gasoline mixtures may not serve for separating the components of ordinary air.

At times, the problem is to analyze a small amount of volatile substance dissolved or suspended in a relatively large volume of solvent. Such a problem exists when one wishes to analyze for the oxygen, nitrogen, carbon monoxide, or carbon dioxide content of blood. Another similar problem is the analysis of anethesia volatiles, e.g., nitrous oxide dissolved in blood. Still another such problem is the analysis for air, i.e., oxygen and nitrogen dissolved in kerosene or jet fuel. Yet another such problem exists when one wishes to analyze for poisonous volatiles in blood such as carbon monoxide, methanol, chloroform, hydrogen cyanide and other poisons inhaled accidentally.

While gas chromatography has been extensively studied for these purposes, the technique has not been successful for accurate quantitative analysis because of certain difficulties with the conventional methods. One cannot inject blood, for example, directly into the flow of inert gas because it would rapidly foul the columns. Thus, it becomes necessary to separate the blood from the gases. The present techniques can be divided into two general classes, neither of which is satisfactory. In one procedure, the inert gas flows into and out of a little bottle or chamber. To take a specific example, the analysis of blood for oxygen, nitrogen and carbon dioxide, the chamber contains dilute sulfuric acid. Since the water in this solution is constantly evaporating it is necessary to provide a column of drying agent which fouls quickly with the large amount of water being evaporated. The blood is sampled in a syringe. This is at best only an approximate measuring technique. The blood is now injected through a rubber dam into the little bottle. The acid liberates the carbon dioxide, and ferricyanide solution in the bottle liberates the oxygen. The nitrogen is also liberated by diffusion into the inert gas such as helium. The gases, particularly oxygen held by hemoglobin are liberated slowly. Thus, this gas is fed to the column in decreasing amounts over a relatively long period of time. When the gas comes off the column and the signal is translated by the recorder, a peak is observed which trails off gradually. This phenomenon is known as trailing. Ideally a symmetrical curve should be drawn. The trailing curve is difficult to quantitate and one has to estimate the area under the curve by approximate methods.

In order to avoid the phenomenon of trailing some scientists use a bypass. In this technique, the gas is allowed to flow through the little bottle. Before injecting the sample, the bottle is cut off from the main stream of helium by two valves permitting the helium to flow through a bypass to the columns. After injection and after the oxygen and other gases have been completely liberated, the valves are turned permitting the gases to be swept into the column. This technique introduces serious error. The flow of helium must not be disturbed or false patterns will be obtained. With this technique the path is changed, the gas resistances are different from when the stream is through the bypass and through the bottle. This is evident on the gas chromatograph recorder by a change in baseline which does not return to normal until long after the curves have been drawn. The curves drawn are thus only an approximation of what they should be since to those skilled in the art of gas chromatography it is essential that the path of the gas remain constant, with constant rate and constant gas resistance. Although many attempts may have been made to solve the foregoing and other difficulties, none, as far as I am aware have ever been successful when carried out into practice.

The present invention describes a system which avoids the foregoing difficulties and a constant baseline is obtained. Curves drawn are so smooth and symmetrical, and reproducible that after proper standards are first run, it is no longer necessary to measure the area under the curves but peak heights may be used for accurate analysis, although highest precision of course requires that the area under the curves be measured, even under ideal conditions. Furthermore, in the present system, only a small amount of drying agent, such as anhydrous calcium sulfate need be used since the liquid does not evaporate into the columns. This is achieved by injecting only the liberated gases into the column by means herein described. Since the gases injected contain water vapor, it is preferable to remove them by a drying agent. But when the water vapor is being measured, as in kerosene, the drying agent is omitted so that the water vapor will register on the columns. In this case, the water vapor is treated as a gas to be assayed.

Thus, an object of the present invention is to provide an arrangement for the separation of gases and liquids so that the gases may then be analyzed by gas chromatography.

Another object of the present invention is to provide an arrangement for feeding precise quantities of gases to a gas chromatography device.

Still another object of the present invention is to provide an arrangement whereby very small quantities of gas may be analyzed by gas chromatography.

Yet another object of the present invention is to provide an arrangement which will provide samples in consistent quantity and volume so that consistent results are obtainable on the reading means of a gas chromatography device without incorrect initial peaks and trailing readings at the ends of recorded curves.

With the foregoing and other objects in view, the invention resides in the novel arrangement and combination of parts, in the details of construction, and in the process steps hereinafter described and claimed, it being understood that changes in the precise embodiment of the invention herein disclosed may be made within the scope of what is claimed without departing from the spirit of the invention.

The invention will appear more clearly from the following detailed description when taken in connection with the accompanying drawing, showing by way of example, preferred embodiments of the inventive idea.

FIGURE 2a shows an enlarged view of a portion of the instrument shown in FIGURE 1a;

FIGURE 3b illustrates in perspective one of the components shown in FIGURE 3a;

FIGURE 3c illustrates in perspective another component shown in FIGURE 3a;

FIGURE 4a shows a more detailed view of still another component arrangement shown in FIGURE 1a;

FIGURE 4b illustrates in still greater detail some of the action which takes places in FIGURE 4a; and, FIGURE 5 shows in detail yet another perspective view of a component illustrated in FIGURE 1a.

Figure 1A:
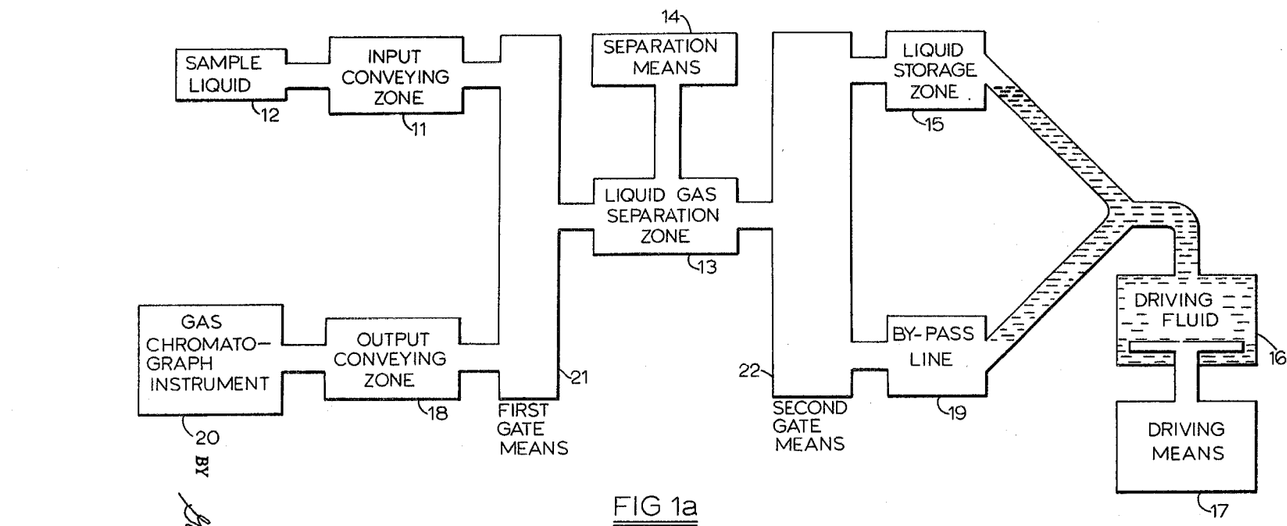
FIGURE 1a is a block diagram of the instrument contemplated herein.
Figure 1B:
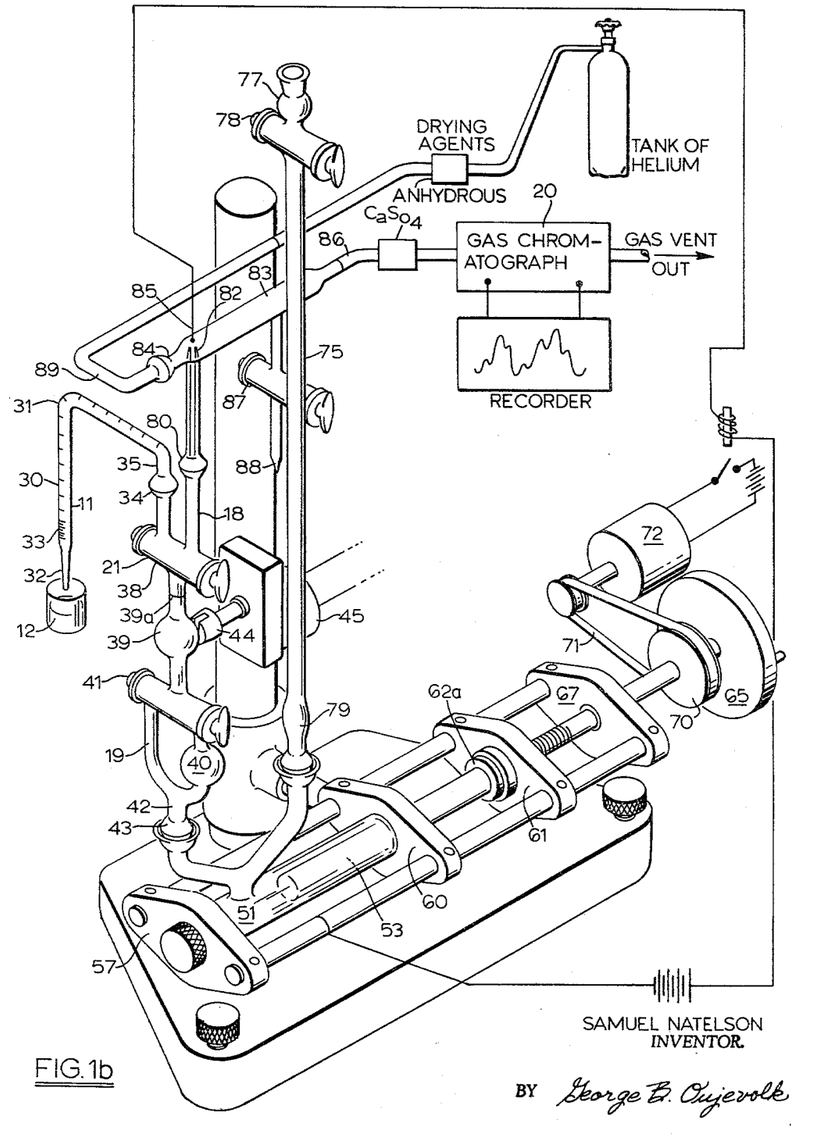
FIGURE 1b is a perspective and partially schematic view of the instrument contemplated herein.
Figure 2A:
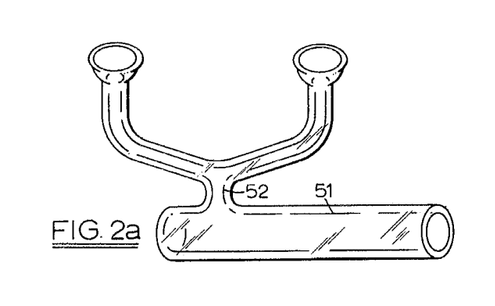
Figure 2B:
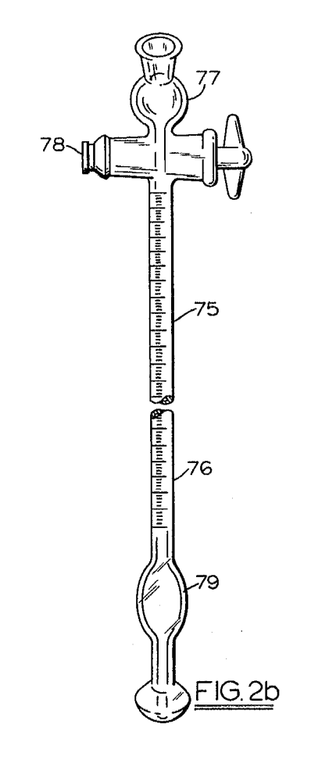
FIGURE 2b is a view of one of the components of the instrument of FIGURE 1a separated from the instrument.
Figure 3A:
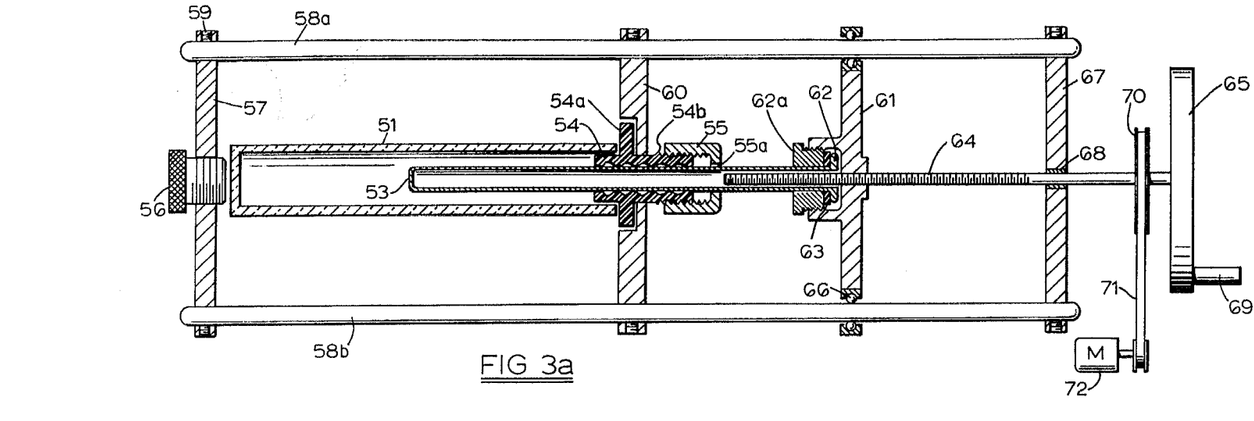
FIGURE 3a depicts a longitudinal cross-sectional view of a portion of a driving arrangement contemplated herein.
Figure 3B:
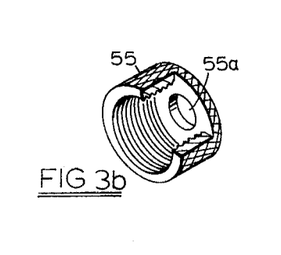
Figure 3C:
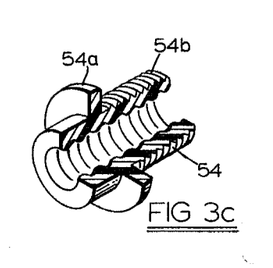
Figure 4A:
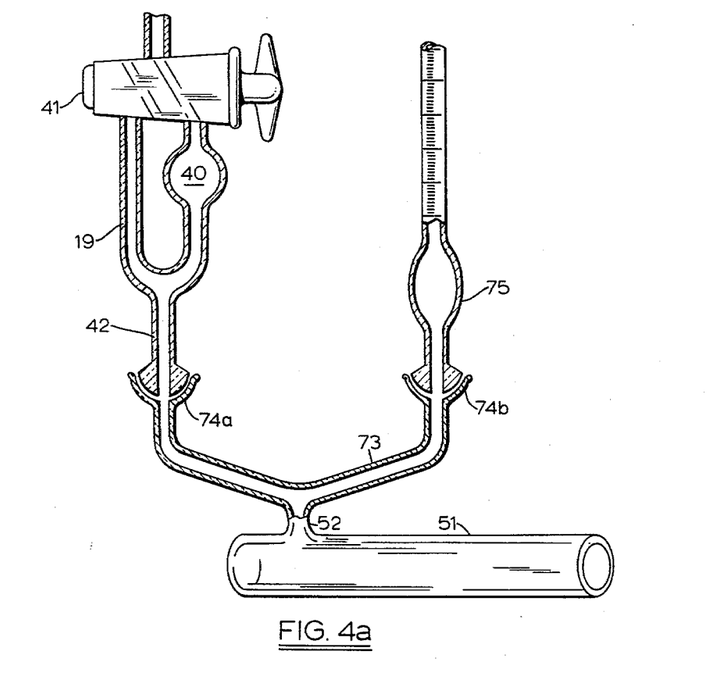
Figure 4B:
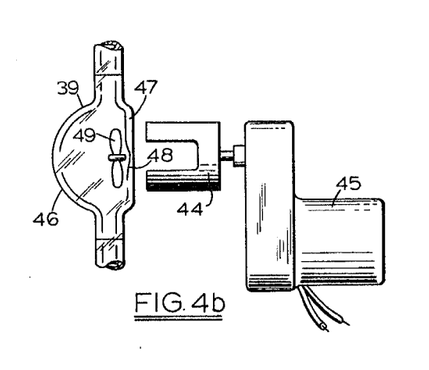
Figure 5:
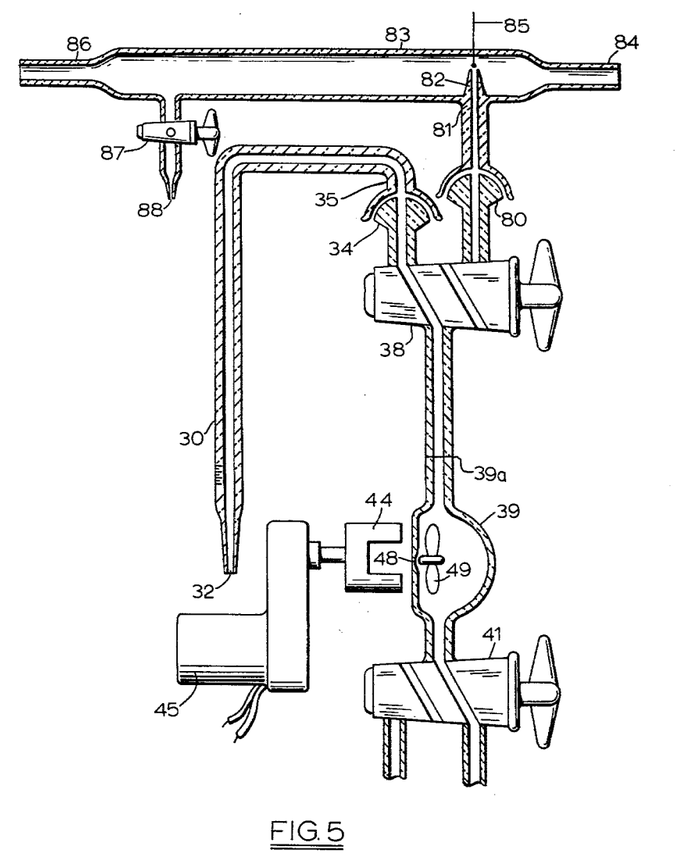

Generally speaking, the instrument will include a fluid sample input conveying zone 11 for conveying a fluid sample 12 to be tested to a liquid-gas separation zone 13 having separation means 14 therein for liberating gases from liquids. After the gases have been liberated from the liquids, the liquids are carried to a liquid storage zone 15. This movement of the fluid sample is driven by a drive fluid in a chamber 16, e.g., mercury, controlled by the action of driving means 17. When the liquid part of the sample has been removed from the separation zone 13 into liquid storage zone 15, the drive fluid will drive the gas in the separation zone to the output conveying zone 18, drive fluid moving through a bypass zone 19. From the output conveying zone 18, the gas is sent to a gas chromatograph instrument 20. A first gate means 21 will permit the sample to pass either from input conveying zone 12 to the liquid-gas separation zone 13 or permit gas in the separation zone 13 to go to the output conveying zone 18. A second gate means 22 will permit liquid to go from the liquid-gas separation zone 13 into the liquid storage zone 15 or some drive fluid to go from the bypass zone 19 into the liquid-gas separation zone 13 to force the gas therein into the output conveying zone.

In carrying the invention into practice, the instrument is first filled with mercury and the sample 12 to be analyzed is introduced into the input conveying zone 11 of the instrument or pipet having a bent tube 31 of relatively large outside diameter and a capillary bore with end 32 drawn to a fine or minute opening, and calibrated at .01, .02 and .03 ml. with calibration marks 33, measuring in this case to .1 ml. A ball joint 34 couples the inner end 35 of bent tube 31, to first gate means 21, namely a first two-way stop cock 38. When the stop cock is at the 0° position, stop cock 38 couples inner end 35 of the pipet to the liquid-gas separation zone 13. When the stop cock is at the 90° position, the liquid-gas separation zone is sealed off, and when at the 180° position, the stop cock couples the liquid-gas separation zone to the output conveying zone 18.

Liquid-gas separation zone 13 includes a reaction chamber 39 having a hemispherical portion 46 and a flattened wall portion 47 with a depression 48 therein. Reaction chamber 39 is acted upon by separating means 14 which includes an iron spinner 49 within the reaction chamber 39, spinning alnico magnet means 44 to turn the spinner, and a motor 45 to turn the magnet means. The spinner is preferably covered with Teflon or glass to protect the glass wall. When the reaction chamber is sealed off and spinner 49 turns, the gas will be liberated from the sample in the reaction chamber. Below the reaction chamber 39 is a liquid storage zone 15 having a reservoir 40 therein and a bypass line 19 in parallel therewith. Interposed between reservoir 40 and parallel bypass line 19 on the one hand and reaction chamber 39 on the other hand is a second two-way stop cock 41 similar to stop cock 38 so that at 0° position the reservoir 40 is coupled to the reaction chamber 39; at 90° position, the reaction chamber is sealed off from both the reservoir and bypass line 19; while at the 180° position, the bypass line is coupled to the reaction chamber. Reservoir 40 and bypass line 19 are coupled to a common junction 42 having a ball joint 43 connecting common junction 42 to the container of the drive fluid 16, and its associated driving means 17.

This portion of the instrument includes a barrel 51 for the drive fluid, an opening 52 in the upper part of the barrel and a connection to ball joint 43 and a stainless steel or glass plunger or piston 53 in the barrel. The barrel 51 is preferably of glass, sealed at one end and ground flat at the other end. The piston moves forward and backwards in the barrel to displace the drive fluid usually mercury although other non-volatile liquids such as silicone oils may be used. The piston 53 enters the barrel 51 through a seal 54 preferably made of Teflon. This seal fits close to the barrel and has annular rings cut into it to make it more flexible and to permit the barrel to slide smoothly in and out over the seal up to a flange 54a on the seal having a flat surface so that when the end of the barrel is pushed against it a seal is made. Over the sealed end of the barrel is a tapered screw cap 55, with a hole 55a, designed to engage tapered threads 54b on seal 54. The outer end of the barrel also includes a tightening screw 56 designed to force the barrel 51 and the ground end thereof against flat surface of flange 54a to seal it.

The barrel and piston arrangement is held in place by an assembly of supporting members. Thus, tightening screw 56 is held rigid by first transverse support 57 which in turn is connected to longitudinal tie rods 58a and 58b by set screws 59. Seal 54 is held by second transverse support 60 also coupled to tie rods 58a and 58b while piston 53 is supported outside of the barrel by third transverse support 61, this transverse support unlike the others glides over or along tie rods 58a and 58b according to the movement of the piston 53 in and out of the barrel. Piston 53 has a flanged end 62 held to third transverse support 61 by a set screw 62a acting on a rubber washer 63. Third transverse support 61 and piston 53 are moved by a threaded rod 64 which moves into the hollow of the piston as drive wheel 65 is rotated. This serves to balance support 61. When turned one way, support 61 and piston 53 advance into the barrel while if turned the other way, the piston moves out of the barrel. In this way the mercury drive fluid is raised or lowered in the upper part of the instrument. To facilitate the gliding of support 61 along tie rods 58a and 58b, bearings 66 are provided.

To support threaded rod 64, a fourth transverse support 67 having a bearing 68 is provided, while to turn wheel 65 by hand, a handle 69 is provided. For motor drive of threaded rod 64 there is a pulley 70 driven by a belt 71 and a motor 72. Advantageously, the instrument may have a manometer likewise coupled to the barrel 51 at opening 52 through the leg of a Y-tube 73, one arm of the Y-tube having a ball joint 74a being coupled to the junction of the reaction chamber and the bypass line, the other arm of the Y being coupled to the manometer 75 by a ball joint 74b. The manometer will have uniform markings 76 in millimeters so that the pressure can be measured. Manometer 75 also has a reservoir 77 to hold the overflow of mercury by means of a stopcock 78 at the top of the manometer, and will also include a safety bulb 79 to prevent pulling the mercury down too low.

Returning now to the reaction chamber 39 in liquid-gas separation zone 13 and two-way stopcock 38 acting as first gate means 21, after the liquid and gases have been separated, it is necessary to send the gas from the liquid-gas separation zone 13 into the gas chromatograph instrument 20 through output conveying zone 18. To this end, second two-way stopcock 41, when turned to the 180° position previously mentioned will couple the bypass line 19 to the reaction chamber 39. At the same time, by turning first stopcock 38 to the 180° position, reaction chamber 39 is coupled to the output conveying zone 18. It is at once apparent that by pushing piston 53 into barrel 51, the mercury drive fluid is forced along bypass line 19 into the reaction chamber, forcing the gas therein through stopcock 38 into the output conveying zone 18. This portion of the instrument is coupled to stopcock 38 across a ball joint 80 and includes a narrow capillary tube 81 of the order of 0.3 mm. bore to prevent gas diffusion. The tip 82 of this narrow capillary disgorges into a gas flow chamber 83 disposed at right angles to capillary tube 81 and having an inlet tube 84 to permit the helium or other inert gases to enter. Disposed over tip 82 of the capillary tube is a platinum wire 85 for making electrical contact. This wire is about 1 mm. distance from the tip and when mercury emerges from the capillary, it closes the contact stopping the motor driving the mercury upwards to inject the gas. At the end of the gas flow chamber opposite inlet tube 84 is outlet tube 86 to the gas chromatograph. Towards this end of the chamber there will also be a stopcock 87 on a drain 88 for draining the gas flow chamber of any liquid which may get into it. In some cases, additional tubing such as connecting elbow tube 89 from the gas tank to the gas flow chamber may be required.

To operate the instrument, the instrument is first filled with mercury to tip 32 of pipet 30 and to the tip of injector, i.e., tip 82. Stopcock 38 is turned so as to connect reaction chamber 39 to pipet 30. Stopcock 41 is turned so as to connect reservoir 40 with reaction chamber 30. The inert gas, e.g., helium is flowing steadily into and out of gas flow chamber 85 into a chromatograph connected to a recorder. Wheel 65 is turned counterclockwise while pipet 30 dips into blood. A quantity of 0.03 ml. is sampled. This is followed by taking up some mercury, about 0.01 ml. Then, a reagent designed to liberate oxygen, e.g., Ferricyanide reagent, is taken up. Mercury is now again taken up until the blood and the reagent are brought below stopcock 38. Stopcock 38 is now turned 90° so that the sample and reagent are isolated from the helium or air. Motor 72 is started by pressing a button so that the mercury is lowered to create a vacuum. The mixture of the blood and reagent is brought to the bottom of the reaction chamber 39. Motor 45 is started and spinner 49 spins to mix blood and the reagent until all the gases have been liberated. The sample is now ready to be injected in the gas chromatography device. As will be explained hereafter, the manometer, if the instrument has one, can be used to check to see if all the gases are liberated. After the gases have been liberated, the piston or plunger is pulled back until the liquid mixture of blood and reagent is in the reservoir 40, the liquid meniscus being just below reaction chamber 39. Now, only gas is in the reaction chamber. Stopcock 41 is now turned from the 0° position to the 180° position to connect with the mercury in bypass line 19 which is now brought up with motor 72 to the 0.12 mark 39a in the reaction chamber 39. The gases are now under a partial vacuum ready to be injected. At this point, stopcock 38 is turned 90° to the 180° position so as to connect reaction chamber 39 to gas flow tube 83. The helium pressure which is above atmospheric pressure will cause the mercury extending from stopcock 38 up to tip 82 to be pushed back into the reaction chamber. When this has settled down, motor 72 is started. The mercury rises and ejects the gas into the gas stream at a constant rate rapidly. When the meniscus of the liquid or mercury reaches the tip 82 it makes contact with platinum wire 85 and stops the motor. This action of the mercury in stopping the motor by contacting the platinum wire 85 is that of the well known mercury switch and for this reason the feedback circuit to stop the motor is not shown in the drawing.

Thus, the gases are injected in exactly the same way each time to get reproducible curves on ahe recorder of the chromatograph. While the pattern is developing on the recorder 20a, stopcock 38 is turned again to the 0° position to connect the pipet 30 again to reaction chamber 39. The mercury is lowered so that the meniscus is at the bottom of the reaction chamber 39. Stopcock 41 is now turned another 180° to the 0° position to connect reservoir 40 with the reaction chamber 39 by advancing the mercury with motor 72 or hand wheel 65 so that this set of components move the piston into the barrel. The blood and reagent float above the mercury and are ejected from the instrument through pipet 30. Wash liquids such as water and detergent are then brought into the machine so as to wash the instrument clean of the previous sample and then these are again ejected through the pipet. The mercury is now brought to the tip of the pipet and the process of analysis can now be repeated.

Since stopcock 38 can be turned so that reaction chamber 39 is connected to the pipet independently of the connection to the chromatograph, the pattern on recorder 20a can be developing while the gas from the next sample is being extracted. As soon as the pattern has been recorded or read, the next gas sample can be injected in the gas chromatograph apparatus immediately. From the foregoing it is apparent therefore that the calibrated pipet assures precise sample measurement and the operating efficiency is limited only by the speed of the developing chromatogram because while the chromatogram is developing, the next sample is prepared for injection. Furthermore, the instrument can be used for injecting into any gas chromatograph apparatus and can be used for routine determinations and special problems. Although not essential to many determination, the manometer is useful as a check to see if all the gases are liberated. This is accomplished by first raising the meniscus of the mercury to the 0.12 mark 39a and recording the pressure in the manometer as the height of the mercury therein. After the gases have been liberated, as mercury is again brought up to the 0.12 mark 39a and the reading in the manometer should be the same as before. This mercury height is also a measure of the volume of the mixed gases liberated and is of value when this information is needed.

The purpose of giving those skilled in the art a better understanding and appreciation of the invention, the following illustrative examples are given:

*Example 1*

For analysis of the gases in whole blood the blood is sampled, drawing up 0.03 ml. by bringing the mercury to the tip of the sampling pipet. The mercury is moved by turning the wheel so as to move the piston back or forth. The tip of the pipet is dipped into the blood and brought to the 0.03 ml. mark by retreating with the piston in the mercury. The tip is now dipped in a pool of mercury drawing up 0.01 ml. In this way the blood is held between two layers of mercury. The tip is wiped and now dipped in a reagent made up of 1 gram potassium ferricyanide dissolved in 100 ml. of 0.8% saponin solution. A layer of caprylic alcohol covers this solution to exclude air. Before use the reagent is de-aerated by evacuation. 0.01 ml. of caprylic alcohol followed by 0.2 ml. of the ferricyanide reagent followed by 0.01 ml. of caprylic alcohol is drawn up in that order. The tip is wiped and now dipped in mercury. Mercury is drawn beyond the first gate means stopcock so as to sweep the blood and reagents into the reaction chamber. The first stopcock is closed.

The piston is now retreated to create a vacuum and bring the reagents into the reaction chamber. The spinner is started to mix the reagents and aid in the liberation of the gases. After three minutes the piston is retreated to bring the mercury and all of the solution into the liquid storage zone. The second gate means stopcock is turned 180° and the piston brought forward to bring mercury to the reaction chamber through the bypass line. The gases are now in the reaction chamber. The first gate means stopcock is now turned so that the chamber communicates with the flowing helium stream. Any mercury above the stopcock on the flow chamber side is driven into the chamber by the pressure of the helium. The motor is started. This drives the gases upward into the flowing helium stream. When the mercury protrudes so as to make contact with the tip of the contact needle in the flow chamber, the motor stops. The first gate means stopcock is now turned 180°. The mercury in the chamber, above the second gate means stopcock is lowered with the piston until it is just above this second stopcock. The second stopcock is now turned 180° and the reagents and spent blood held in the storage zone is ejected and discarded. After rinsing the machine twice with water, by bringing the water in and ejecting by means of the piston, the instrument is ready for the next sample. The gas chromatograph draws the gas pattern while the next sample is being processed.

*Example 2*

For the analysis of dissolved gases in jet fuel the procedure of Example 1 is followed with the following changes:

0.2 ml. of jet fuel is sampled by the pipet as before. For convenience the jet fuel is poured into a test tube containing mercury. The pipet with a bubble of mercury protruding from the tip is dipped into the jet fuel. 0.2 ml. is sampled by retreating with the piston. Without removing the tip from the jet fuel it is dipped directly into the mercury at the bottom. The mercury is now drawn in to sweep the jet fuel into the reaction chamber. The first stopcock is turned 90° to close. The piston is retreated to evacuate the gases, the upper meniscus of the jet fuel extending into the reaction chamber. The spinner is started to mix the jet fuel so as to assist in the liberation of the gases. After three minutes the jet fuel is sequestered in the storage zone as in Example 1 and the liberated gases injected into the helium stream as in Example 1. The gas pattern now is drawn on the gas chromatography recorder.

It is to be observed therefore that the present invention is directed to an instrument for liberating volatile material in a sample mixture 12 of volatile and non-volatile material and injecting the volatile material into a gas chromatograph apparatus. The instrument comprises the combination of an input zone 11 for taking up the sample; a separation zone 13 coupled to the input zone, including separation means 14 therein; a storage zone 15 for temporarily storing a liquid therein; a drive fluid chamber 16 coupled to said storage zone designed to hold a drive fluid therein including fluid driving means coupled to said chamber; a bypass zone 19 in parallel with said storage zone between said separation zone and said chamber; an output conveying zone 18 coupled to said separation zone; and, first and second "or" gate means 21 and 22, connecting in the first instance said separation zone and either said input or output zones, and in the second instance said separation zone and either said storage or bypass zones or blocking the coupling to said zones. The first and second gate means are shown as two-way stopcocks 38 and 41 having three positions. The storage zone and bypass zone are connected to two arms of a three-way connector. The drive fluid chamber which is connected to the third arm of the connector is barrel-shaped and the driving means includes a piston disposed for axial movement in the barrel. The output conveying zone includes a narrow capillary 81 with a tip. The capillary is coupled to said first gate means discharging into a gas flow chamber 83 disposed at right angles to the capillary. In the vicinity of tip 82 is a contact 85 designed to be part of electrical circuitry to close the fluid drive means 17 when the drive fluid passes through the tip and touches the contact. Furthermore, it is advantageous to have a manometer coupled to the drive fluid which will indicate when the volatile matertial is completely separated and give a measure of this material.

It will be apparent to those skilled in the art, that my present invention is not limited to the specific details described above and shown in the drawing, and that various modifications are possible in carrying out the features of the invention and the operation and method of support, mounting and utilization thereof, without departing from the spirit and scope of the appended claims.

I claim:
1. An instrument for liberating volatile material in a sample mixture of volatile and non-volatile material and injecting the volatile material into a gas chromatograph apparatus, comprising in combination;
   input means for taking up the sample;
   a separation chamber coupled to said input means including separation means therein;
   a storage chamber coupled to said separation chamber for temporarily storing a liquid therein;
   a drive fluid chamber coupled to said storage chamber designed to hold a drive fluid therein including fluid driving means coupled to said drive fluid chamber;
   a bypass line in parallel with said storage chamber between said separation chamber and said drive fluid chamber;
   output conveying means coupled to said separation chamber; and,
   first and second three-way stopcock means connecting in the first instance said separation chamber with either said input means or output conveying means or neither and in the second instance said separation chamber with either said storage chamber or bypass line or neither.
2. An instrument for liberating a gas from a liquid-gas mixture and injecting said gas into a gas chromatograph apparatus comprising in combination;
   input conveying means for taking up a sample of a liquid-gas mixture;
   a liquid-gas separation chamber to which the sample is conveyed including separation means therein for liberating gases from liquids;
   a liquid storage chamber for temporarily storing the liquid separated from the gases while the gases are injected into a gas chromatograph apparatus;
   a drive fluid chamber coupled to said storage chamber designed to hold a drive fluid therein which is used to take up a sample by the input conveying means and to drive liberated gases into the gas chromatograph apparatus and, driving means to drive the drive fluid;

a bypass line in parallel with said liquid storage chamber coupled between said separation zone and said drive fluid chamber;

output conveying means coupled to the separation chamber for delivering gases separated in the separation chamber into a gas chromatograph apparatus;

first three way stopcock means between the input conveying means, the liquid separation chamber and the output conveying means designed so as to couple the separation chamber either to the input conveying means or the output conveying means or to seal off the separation chamber from said input and output conveying means;

and second three way stopcock means between said separation chamber and said storage chamber and bypass line designed so as to couple the separation chamber either to the storage chamber or the bypass line or seal off the separation chamber from the separation chamber and bypass line.

3. An instrument as claimed in claim 1, said separation chamber including a reaction chamber having a hemispherical portion and a flattened wall portion; said separation means including a spinner within said separation chamber, and outside said chamber magnet means turned by a motor to turn the spinner.

4. An instrument as claimed in claim 1, wherein,
there is a three-way connector, said liquid storage chamber and bypass line being connected to two of the three connectors;
said chamber including a cylindrical barrel being connected at one end to the third connection of said three-way connector;
said driving means includes a piston being disposed for axial movement in said barrel.

5. A device as claimed in claim 1, said output conveying zone including a narrow capillary and tip, a gas flow chamber into which said capillary tip disgorges, including an inlet to permit gases to enter at right angles to said capillary, a contact in the vicinity of said tip designed to be coupled to circuitry to close said drive means when drive fluid passes through said tip and touches said contact.

6. An instrument for liberating volatile material in a sample mixture of volatile and non-volatile material and injecting the volatile material into a gas chromatograph apparatus comprising in combination;
a pipet for taking up the sample;
a reaction chamber coupled to said pipet having a spinner therein and magnetic means with a motor outside the reaction chamber to turn the spinner;
a reservoir coupled to the reaction chamber for temporarily storing the non-volatile sample material;
a barrel, for storing a drive fluid therein coupled to the reservoir across a three-arm tube, said reservoir being coupled to one arm, the barrel to the other;
a bypass line coupled to said third arm in parallel with said reservoir and leading to said reaction chamber;
a piston in said barrel for driving said drive fluid including driving means to drive the piston;
an output conveying zone including a capillary tube and tip leading into a gas flow chamber with an inlet and outlet tube thereto;
a first three-way stopcock interposed between said reaction chamber and said pipet and output conveying zone, permitting connection between said reaction chamber and the pipet or the output conveying zone or neither; and
a second three-way stopcock interposed between said reaction chamber and the reservoir and bypass line permitting connection between said reaction chamber and the reservoir or bypass line or neither.

7. A device as claimed in claim 6 including a contact in the gas flow chamber near said capillary tip including a feedback control circuit to said driving means, said feedback circuit stopping said driving means upon the drive fluid touching said contact.

8. A device as claimed in claim 6 including a manometer coupled to said barrel said manometer determining when the gases are completely liberated and giving a measurement of the quantity extracted.

9. A device as claimed in claim 8, said manometer including a safety bulb near said barrel, a manometer reservoir at the top and a stopcock at the top.

References Cited by the Examiner
UNITED STATES PATENTS

| | | | |
|---|---|---|---|
| 2,680,060 | 6/54 | Natelson | 23—253 |
| 2,773,747 | 12/56 | King et al. | 23—253 |
| 2,999,673 | 9/61 | Kessler | 23—253 X |
| 3,111,390 | 11/63 | Taylor | 23—253 |

MORRIS O. WOLK, *Primary Examiner.*

DELBERT E. GANTZ, *Examiner.*